(12) United States Patent
Wood et al.

(10) Patent No.: US 9,096,376 B1
(45) Date of Patent: Aug. 4, 2015

(54) ENDLESS BELT CONVEYOR WITHIN A TUBULAR HOUSING

(71) Applicant: J. & M. Manufacturing Co., Inc., Fort Recovery, OH (US)

(72) Inventors: James E. Wood, Fort Recovery, OH (US); Joseph R. Wuebker, Fort Recovery, OH (US)

(73) Assignee: J.&M. Manufacturing Co., Inc., Fort Recovery, OH (US)

( * ) Notice: Subject to any disclaimer, the term of this patent is extended or adjusted under 35 U.S.C. 154(b) by 0 days.

(21) Appl. No.: 14/527,991

(22) Filed: Oct. 30, 2014

(51) Int. Cl.
　　*B65G 15/08*　　(2006.01)
　　*B65G 21/08*　　(2006.01)
　　*B65G 23/44*　　(2006.01)
　　*B65G 21/00*　　(2006.01)

(52) U.S. Cl.
　　CPC .............. *B65G 15/08* (2013.01); *B65G 21/00* (2013.01); *B65G 23/44* (2013.01)

(58) Field of Classification Search
　　CPC .... B65G 15/08; B65G 2201/04; B65G 15/42; B65G 21/08
　　USPC ................................. 198/818, 819, 820, 821
　　See application file for complete search history.

(56) References Cited

U.S. PATENT DOCUMENTS

| | | | | | |
|---|---|---|---|---|---|
| 2,375,065 | A | * | 5/1945 | Askue | 198/840 |
| 2,688,394 | A | * | 9/1954 | Hurd et al. | 198/816 |
| 3,186,536 | A | * | 6/1965 | Hinchcliffe | 198/846 |
| 3,212,628 | A | * | 10/1965 | Massey et al. | 198/311 |
| 5,052,545 | A | * | 10/1991 | Gongen | 198/534 |
| 6,109,427 | A | * | 8/2000 | Hosch et al. | 198/835 |
| 6,170,644 | B1 | * | 1/2001 | Nakaegawa et al. | 198/811 |
| 6,675,958 | B2 | * | 1/2004 | Kaeb et al. | 198/860.5 |
| 7,428,858 | B2 | * | 9/2008 | Owens | 198/699 |

* cited by examiner

*Primary Examiner* — James R Bidwell
(74) *Attorney, Agent, or Firm* — Jacox, Meckstroth & Jenkins

(57) ABSTRACT

A belt conveyor for transferring a granular material has an elongated cylindrical housing having opposite ends connecting an inlet end portion to an outlet end portion with each end portion supporting a roller for receiving a flexible endless belt. The belt has a width greater than the diameter of the housing causing the belt to curve upwardly within the housing for form a trough for receiving and transferring the material. To maintain alignment of the belt on the rollers and within the housing, an inner surface of the belt has a continuous flexible guide rib, and each roller has a circumferential groove for receiving the guide rib. To extend the life of the belt and the guide rib, the belt is tensioned by adjusting one of the rollers to space the guide rib above the inner surface of the housing when material is being transferred within the housing.

11 Claims, 3 Drawing Sheets

ENDLESS BELT CONVEYOR WITHIN A TUBULAR HOUSING

BACKGROUND OF THE INVENTION

The present invention relates to endless belt conveyors for transferring granular material such as seed or grain and of the general type disclosed in U.S. Pat. Nos. 3,212,628, 5,052,545 and 6,675,958, the latter Patent having a disclosure herein incorporated by reference. In such a conveyor, an endless flexible belt extends around rollers located at opposite end portions of the conveyor, and an upper run of the endless belt extends through a tubular or cylindrical housing. The housing has an inner diameter smaller than the width of the flexible belt so that the upper run of the belt curves upwardly within the tubular housing to form a continuously moving trough for conveying the material.

A common problem with such a conveyor when transferring seed or grain is caused by belt misalignment on the rollers and within the tubular housing. This causes one side of the curved belt within the housing to move or shift upwardly above the other side with the result that some of the seed falls under the belt. This results in some of the seeds being crushed and collecting on the rollers to create further misalignment of the belt and also loss of seed or seed damage. It is then necessary to stop the conveyor, clean the rollers and realign the belt on the rollers.

In endless belt conveyors where the upper run of the belt remains flat when transferring material, it is known to maintain the belt in alignment with the end rollers and prevent lateral shifting of the belt by the use of some form of guide rib or ribs attached to the inner surface of the endless conveyor belt. The guide rib is directed into grooves formed within the end rollers for the belt, for example, as disclosed in U.S. Pat. Nos. 3,186,536 and 7,428,858. In such conveyors, the flat upper run of the conveyor belt is commonly supported by flat surfaces or closely spaced rollers having grooves for receiving the guide rib and to prevent friction wear of the guide rib by the weight of the material being transferred.

SUMMARY OF THE INVENTION

The present invention is directed to an improved endless belt conveyor of the type disclosed in above mentioned U.S. Pat. No. 6,675,958 and wherein the endless flexible belt is directed through a tubular or cylindrical housing having a diameter smaller than the width of the belt causing the belt to curve upwardly within the housing to define a continuously moving trough for receiving and transferring the material. The endless belt has an inner surface with a longitudinally extending guide rib, and each of the end rollers of the conveyor has a circumferential groove receiving the guide rib for maintaining longitudinal alignment and avoid lateral movement of the curved upper run of the belt within the housing. The end rollers of the conveyor have shafts supported by bearings mounted on end portions of the conveyor, and the shaft and end bearings for at least one of the rollers is supported for adjustment in order to select the tension in the belt.

The tension in the belt is adjusted so that the guide rib on the curved upper run of the belt within the housing belt does not rub on the inner surface of the housing along the entire length of the housing due to the weight of the material being conveyed by the belt. Preferably, the tension in the belt is adjusted so that the guide rib is spaced slightly above the inner surface of the housing so that there is no frictional wear on the guide rib. As a result, the alignment of the belt is maintained and down time of the conveyor for cleaning and belt realignment is eliminated. That is, the guide rib on the belt cooperates with the grooves within the end rollers to maintain the curved upper run of the belt within the housing in a centered position within the housing so that seed or grain is not lost from the belt and is not smashed and collected on the rollers to cause further misalignment of the belt on the rollers and within the tubular housing.

DESCRIPTION OF THE ILLUSTRATED EMBODIMENT

Figure 1:
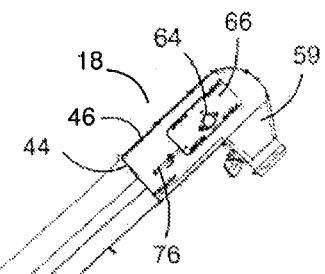
FIG. 1 is an elevational view of an endless belt conveyor constructed in accordance with the invention and shown in an inclined position without the lower run of the belt.

FIG. 1 illustrates an endless belt conveyor 10 which is commonly supported by a frame and a set of wheels, for example, as shown in above mentioned U.S. Pat. No. 3,212, 628. The conveyor 10 includes an elongated tubular or cylindrical housing 15 having opposite end portions connected to an inlet end portion 16 and a discharge or outlet end portion 18 of the conveyor. The housing 15 is reinforced on opposite sides by longitudinally extending reinforcement members or channels 21 to maintain the housing with a linear center axis. The inlet end portion 16 has parallel spaced vertical side plates 23 which are connected by a plate 24 to the inlet end of the housing 15. The side plates 23 support a roller 28 having a center shaft 29 with opposite end portions supported by bearings 32. The bearings are mounted on adjustable plates 34 attached to the side plates 23, and each plate 34 is adjustable axially of the conveyor by an adjustment screw 37 to position the axis of the roller 28 precisely normal or perpendicular with respect to the axis of the housing 15.

Figure 2:
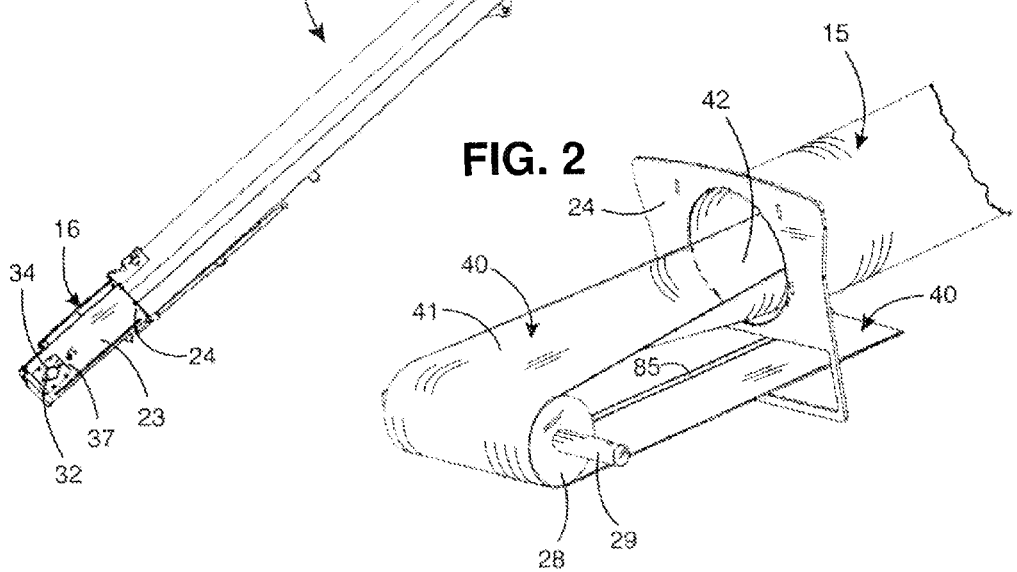
FIG. 2 is a diagrammatic perspective view of the inlet portion of the conveyor.
Figure 3:
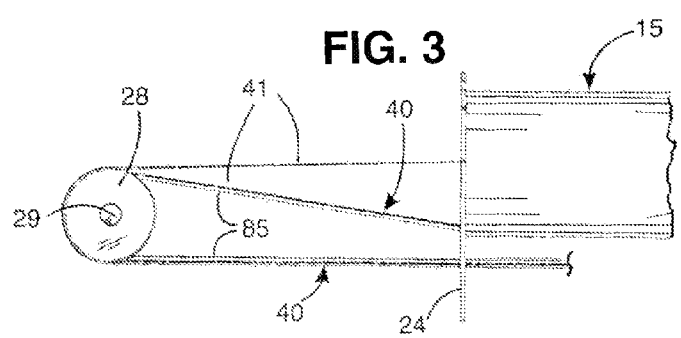
FIG. 3 is a fragmentary elevational view of the components shown in FIG. 2.
Figure 4:
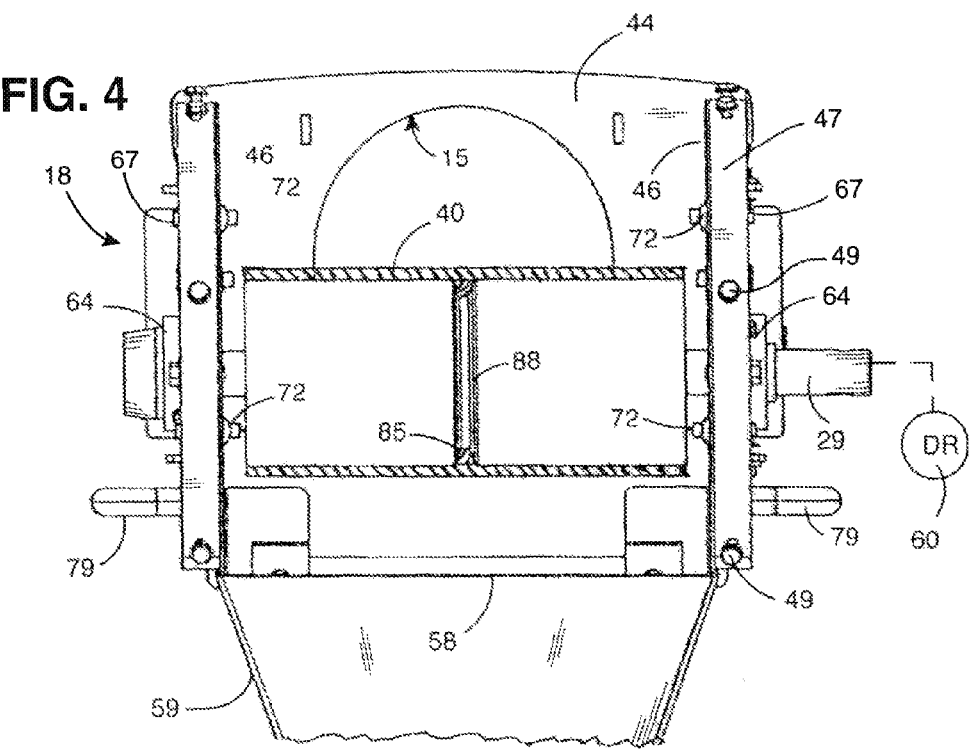
FIG. 4 is a fragmentary section of the outlet end portion of the conveyor, shown in FIG. 1.
Figure 5:
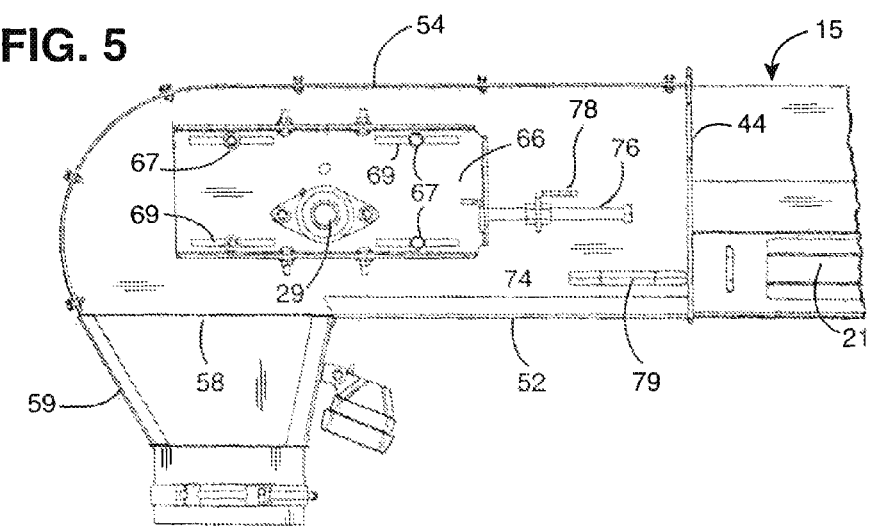
FIG. 5 is a fragmentary side elevational view of the outlet end portion of the conveyor shown in FIGS. 1 and 4.
Figure 6:
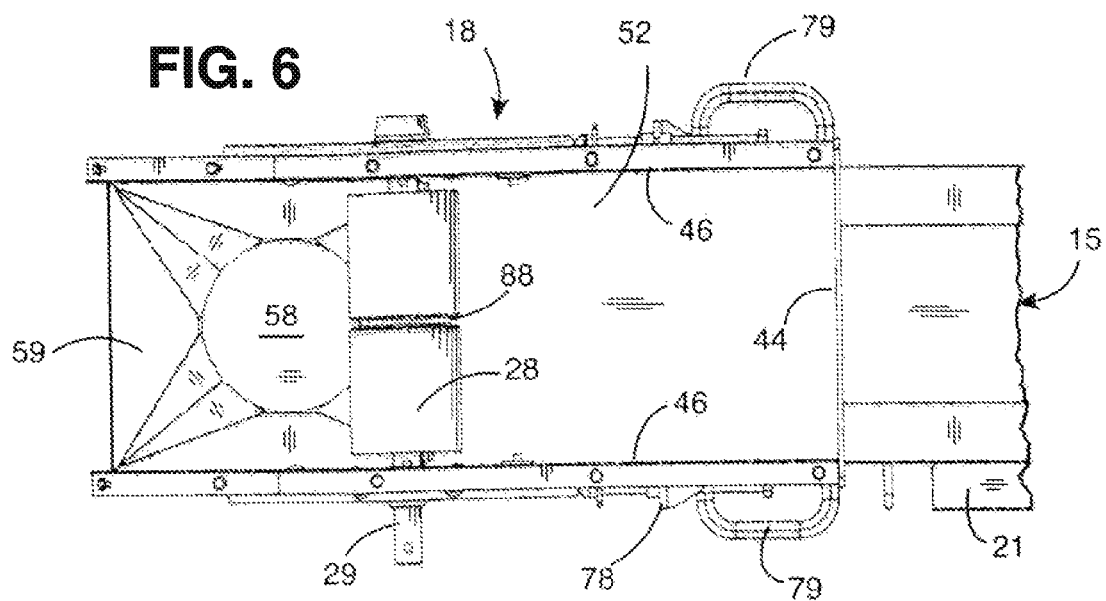
FIG. 6 is a fragmentary section of the outlet end portion of the conveyor and without the conveyor belt.
Figure 7:
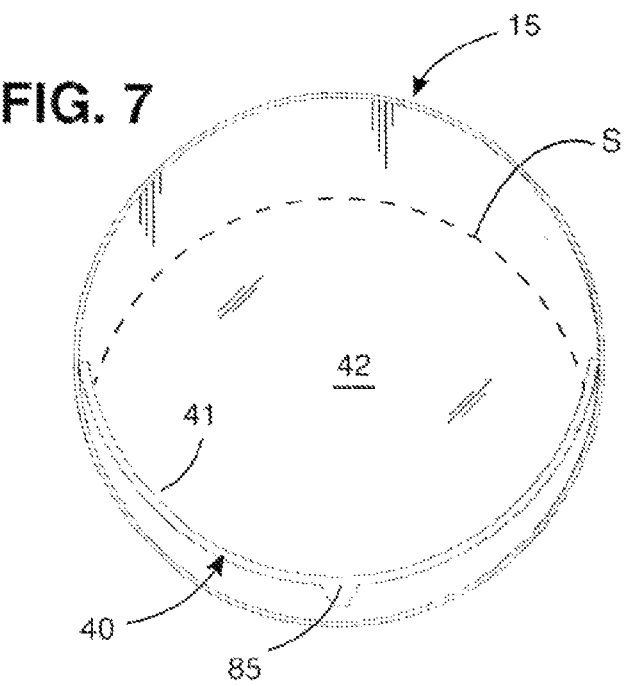
FIG. 7 is a radial section of the conveyor housing shown in FIGS. 1-3 and showing material or seed being transferred by the conveyor.

An endless flexible conveyor belt 40 extends around the roller 28 and has an upper conveyor run 41 which extends through the tubular housing 15 where the belt curves upwardly as shown in FIGS. 2 and 7 to define a continuously moving trough 42. The trough 42 receives the material or seed which is supplied to the upper run 41 of the conveyor at the inlet portion 16 of the conveyor. Referring to FIGS. 4-6, the upper discharge end portion 18 of the conveyor includes a radial end plate 44 which is secured or welded to the upper end of the housing 15. The plate 44 supports parallel spaced vertical side plates 46 having end flanges 47 secured to the end plate 44 by a set of bolts 49. The side plates 46 are also connected by a flat bottom plate 52 (FIG. 5) and a top plate 54 having a curved end portion 56 with a lower end cooperating with the bottom plate 52 to define an outlet 58 for the discharge end portion 18 of the conveyor. A funnel-like hopper 59 extends downwardly from the outlet 58 and may receive a flexible tubular conduit (not shown).

The upper end portion 18 of the conveyor 10 also supports another roller 28 which has a center shaft 29 connected to a drive 60 such as an electric motor or hydraulic motor or gasoline engine. Opposite end portions of the shaft 29 are rotatably supported by bearings 64 (FIGS. 4 & 5) which are mounted on plates 66 adjustably secured to the side plates 46 of the end portion 18 of the conveyor by a set of threaded fasteners or bolts 67. The bolts 67 extend through corresponding slots 69 within the side plates 46 and are threaded into nuts 72 (FIG. 4) secured to the side plates 46. When the fasteners 67 are released, each plate 66 may be individually adjusted longitudinally or axially of the conveyor 10 by adjusting a pair of nuts 74 threaded onto a longitudinally extending bolt 76 welded to the corresponding plate 66. The nuts are located on opposite sides of an angle bracket 78 secured or welded to the corresponding side plate 46. A set of handles 79 are attached to the side plates 46 for maneuvering the conveyor 10 on its supporting wheels (not shown).

In accordance with the present invention, the elongated flexible endless conveyor belt 40 extends around the rollers 28 at opposite ends of the conveyor 10 with the upper run 41 extending through the tubular or cylindrical housing 15. As shown in FIGS. 2 & 4, the endless belt 40 has a width greater than the inside diameter of the cylindrical housing 15 so that the upper run 41 of the belt curves upwardly within the housing 15, as mentioned above and shown in FIGS. 2 & 7. The endless belt 40 of the invention has an inner surface with a longitudinally extending endless guide rib 85 which is also formed of a flexible material such as a reinforced endless V-belt material and having a cross-sectional profile of a V-belt. The flexible guide rib 85 is bonded to the inner surface of the endless belt 40 by adhesive, pressure and heat so that the flexible rib 85 is permanently secured to the flexible belt 40. As shown in FIGS. 2, 4 & 6, each of the end rollers 28 have a circular center groove 88 which receives the guide rib 85, and the grooves cooperate to maintain the belt 40 centered on the rollers 28 and in alignment with the housing 15 so that the curved upper run 41 of the belt 40 remains always centered within the housing 15, as shown in FIG. 7.

Also in accordance with the invention, the tension in the endless belt 40 is precisely selected with the upper end roller 28 by adjusting the position of the bearings 64 and the upper end roller 28 with the adjustment nuts 74 on the screws 76 so that the guide rib 85 does not rub on the bottom inner surface of the housing 15. Preferably the rib 85 is spaced slightly above the inner surface of the housing 15, as shown in FIG. 7, when the upper run of the conveyor 40 is carrying or continuously transporting a predetermined volume and weight of material or seed S, as also shown in FIG. 7. As a result, the guide rib 85 does not continuously contact the bottom inner surface of the housing 15 and thereby avoids wear of the guide rib 85 due to friction with the housing. It is understood that the tension in the belt may also be adjusted by adjusting the roller 28 located at the opposite or lower end of the conveyor 10.

An endless belt conveyor 10 constructed in accordance with the invention provides desirable features and advantages for an operator of the conveyor. For example, the conveyor 10 eliminates the well known problem of the operator of a conveyor, as disclosed in U.S. Pat. No. 6,675,958, stopping the conveyor to realign the conveyor belt extending around the rollers and through the housing when the endless belt shifts slightly on one or both of the end rollers. Also, the conveyor 10 eliminates the common problems of loss of seed from the lower side of a misaligned curved upper run of the conventional conveyor belt within the housing and the crushing and build up overflow seed between the belt and one or both of the end rollers and the problem of cleaning of the rollers and realignment of the belt on the rollers. Thus the combination of the endless conveyor belt 40 and rollers 28 of the invention thereby significantly extend the operational life of the conveyor without interruption for maintenance.

While the method and form of conveyor herein described constitute a preferred embodiment of the invention, it is to be understood that the invention is not limited to the precise method and form of conveyor described, and that changes made therein without departing from the scope and spirit of the invention as defined in the appended claims.

What is claimed is:

1. A conveyor adapted for transferring granular material such as seed or grain, said conveyor comprising
    an elongated linear tubular housing having opposite ends connected to an inlet end portion of said conveyor and an outlet end portion of said conveyor,
    a roller having a center shaft supported by bearings mounted on each said end portion of said conveyor for rotation on a horizontal axis, and a drive connected to rotate said shaft of one said roller,
    a flexible endless conveyor belt extending around each said roller and having an upper run extending through said tubular housing with said upper run curved upwardly by an inner surface of said housing to define a U-shape trough for receiving and transferring the material,
    said endless belt having an inner surface with a longitudinally extending guide rib, and each said roller having a circumferential groove receiving said guide rib for maintaining alignment of said belt on each said roller and within said housing,
    an adjustment mechanism on at least one said end portion of said conveyor for moving said bearings for said shaft and said roller in a direction to adjust the tension in said belt, and
    said adjustment mechanism being adjusted to position said guide rib on said belt in a position within said housing that prevents continuous rubbing of said guide rib against said inner surface of said housing when material is being conveyed by said upper run of said belt for substantially extending the operational life of said belt and said guide rib and for minimizing loss of material and damage to the material.

2. A conveyor as defined in claim 1 wherein said guide rib on said endless belt and said groove in each said roller has generally a U-shape cross-sectional profile.

3. A conveyor as defined in claim 1 wherein said guide rib is continuously bonded to said endless belt by adhesive, pressure and heat.

4. A conveyor as defined in claim 1 wherein a single said guide rib is located at the longitudinal center of said belt and a single said groove is located at the center of each said roller.

5. A conveyor adapted for transferring granular material such as seed or grain, said conveyor comprising
    an elongated linear tubular housing having opposite ends connected to an inlet end portion of said conveyor and an outlet end portion of said conveyor,
    a roller having a center shaft supported by bearings mounted on each said end portion of said conveyor for rotation on a horizontal axis, and a drive connected to rotate said shaft of one said roller,
    a flexible endless conveyor belt extending around each said roller and having an upper run extending through said tubular housing with said upper run curved upwardly by an inner surface of said housing to define a U-shape trough for receiving and transferring the material,
    said endless belt having an inner surface with a longitudinally extending guide rib, and each said roller having a circumferential groove receiving said guide rib for maintaining alignment of said belt on each said roller and within said housing, an adjustment mechanism on at least one said end portion of said conveyor for moving said bearings for said shaft and said roller in a direction to adjust the tension in said belt, and said adjustment mechanism being adjusted to position said guide rib on said belt spaced above said inner surface of said housing when material is being conveyed by said upper run of said belt within said housing for substantially extending the operational life of said belt and said guide rib and for minimizing loss of material and damage to the material.

6. A conveyor as defined in claim 5 wherein said guide rib on said endless belt and said groove in each said roller has generally a V-shape cross-sectional profile.

7. A conveyor as defined in claim 5 wherein said guide rib is continuously bonded to said endless belt by adhesive, pressure and heat.

8. A conveyor as defined in claim 5 wherein a single said guide rib is located at the longitudinal center of said belt and a single said groove is located at the center of each said roller.

9. A method of transferring granular material such as seed or grain with an endless belt conveyor, comprising the steps of forming an elongated and linear tubular housing having opposite ends connected to an inlet end portion and an outlet end portion of said conveyor, positioning a roller on each end portion of the conveyor for rotation on a horizontal shaft, and connecting a power operated drive to rotate the shaft of one roller, directing a flexible endless conveyor belt around each roller with an upper run of the belt extending through the housing and curved upwardly by an inner surface of the housing to define a trough for receiving and transferring the material, forming on an inner surface of the endless belt a longitudinally extending guide rib, and forming on each roller a circumferential groove receiving the guide rib for maintaining alignment of the belt on each roller and within the housing, positioning an adjustment mechanism on one end portion of the conveyor for moving the corresponding roller in a direction to adjust the tension in the belt, and adjusting the adjustment mechanism to position the guide rib on the belt above the inner surface of the housing when material is being conveyed by the upper run of the belt within the housing for substantially extending the operational life of the belt and the guide rib and for minimizing loss of material and damage to the material.

10. A method as defined in claim 9 and including the step of continuously bonding the guide rib to the endless belt by adhesive, pressure and heat.

11. A method as defined in claim 9 and including the steps of locating a single guide rib at the longitudinal center of the belt and locating a single groove at the center of each roller.

* * * * *